United States Patent [19]

Torii et al.

[11] Patent Number: 4,934,504
[45] Date of Patent: Jun. 19, 1990

[54] APPARATUS FOR SETTING TURNING MOVEMENT REGION OF TRUNK BODY OF INDUSTRIAL ROBOT

[75] Inventors: Nobutoshi Torii, Hachioji; Yasuo Naito, Hino; Kazuhisa Otsuka, Hino; Satoshi Kinoshita, Hino, all of Japan

[73] Assignee: Fanuc Ltd., Yamanashi, Japan

[21] Appl. No.: 437,307

[22] Filed: Nov. 17, 1989

Related U.S. Application Data

[63] Continuation of Ser. No. 231,915, Jun. 16, 1988, abandoned.

[30] Foreign Application Priority Data

Oct. 17, 1986 [JP]  Japan .................. 61-245515

[51] Int. Cl.⁵ .............................................. F16D 71/00
[52] U.S. Cl. ..................................... 192/139; 74/822; 74/813 L; 901/11; 901/12; 901/13
[58] Field of Search ............... 192/138, 139, 142 R; 901/11, 12, 13; 74/526, 813 L, 822, 821

[56] References Cited

U.S. PATENT DOCUMENTS

| | | | |
|---|---|---|---|
| 2,660,895 | 12/1953 | Waters | 74/822 |
| 3,178,001 | 4/1965 | Prescott | 192/139 |
| 3,717,231 | 2/1973 | Kaufeldt | 192/139 |
| 3,739,660 | 6/1973 | Schubert | 74/813 L |
| 4,132,318 | 1/1979 | Wang et al. | 901/12 |
| 4,295,555 | 10/1981 | Kamm | 192/139 |
| 4,674,948 | 6/1987 | Hornacek | 901/11 |
| 4,721,017 | 1/1988 | Jorgensen et al. | 74/813 L |

FOREIGN PATENT DOCUMENTS

| | | |
|---|---|---|
| 60-118477 | 6/1985 | Japan . |
| 60-123280 | 7/1985 | Japan . |
| 61-42287 | 3/1986 | Japan . |
| 61-29088 | 12/1986 | Japan . |
| 62-19190 | 2/1987 | Japan . |
| 62-28194 | 2/1987 | Japan . |
| 1294599 | 3/1987 | U.S.S.R. ............ 901/11 |
| 87/00790 | 12/1987 | World Int. Prop. O. ....... 901/11 |

Primary Examiner—Rodney H. Bonck
Assistant Examiner—Nicholas Whitelaw
Attorney, Agent, or Firm—Armstrong, Nikaido, Marmelstein, Kobovcik & Murray

[57] ABSTRACT

Angular regions (A, B) for turning a trunk body (12) of an industrial robot can be changed in accordance with an operation of the industrial robot by setting movable stoppers (18, 20). Turning movement can be stopped by an electrical means (LS1, LS2, LS3, LS4, LS5) to protect a drive motor and a drive mechanism, just before a stopper (22) fixed on the trunk body collides with mechanical stoppers (14, 16, 18, 20). An accident based on an error operation of the movable stoppers can be prevented by disposing proximity detectors (PS1, PS2, PS3, PS4).

7 Claims, 3 Drawing Sheets

APPARATUS FOR SETTING TURNING MOVEMENT REGION OF TRUNK BODY OF INDUSTRIAL ROBOT

This application is a continuation of application Ser. No. 231,915 filed June 16, 1988 now abandoned.

DESCRIPTION

1. TECHNICAL FIELD

The present invention relates to an apparatus for setting a turning movement region of a trunk body of an industrial robot which turns against a base portion of the industrial robot, and more particularly, to an apparatus for enabling a plurality of turning movement regions of the trunk body to be set.

2. BACKGROUND ART

Conventionally, a turning movement region of a trunk body for turning against a fixed portion (a base portion) of an industrial robot is fixed, and is set when the robot is installed.

Accordingly, usually the turning movement region is set to a wide range to enable it to be used for various operations of the robot, since the fixed turning movement region of the trunk body of the industrial robot cannot be changed. Therefore, other objects cannot be disposed in the wide angle range of the turning trunk body, and useless floor space remains in a workshop.

DISCLOSURE OF THE INVENTION

Accordingly, an object of the present invention is to provide an apparatus for enabling a plurality of turning movement regions of the trunk body of an industrial robot to be set, to thereby solve the abovementioned problem.

In view of the foregoing object, the present invention first provides an apparatus for setting a plurality of turning movement regions of a trunk body of an industrial robot. The trunk body is driven to turn against a base portion of the industrial robot. The apparatus comprises at least two mechanical stoppers on the base portion. At least one of the mechanical stoppers is a movable stopper having a drive device for operating the stopper as a stopper or releasing the stopper. Another stopper on the trunk body cooperates with the mechanical stoppers for stopping a turning movement of the trunk body, thereby operating the movable stopper to change a combination of the mechanical stoppers, and change and reset the turning movement regions of the trunk body.

A second present invention provides an apparatus for setting a plurality of turning movement regions of a trunk body of an industrial robot. The trunk body is driven to turn against a base portion of the industrial robot. At least two mechanical stoppers are on the base portion. At least one of the mechanical stoppers is a movable stopper having a drive means for operating the stopper as a stopper or releasing the stopper. Another stopper on the trunk body cooperates with the mechanical stoppers for stopping a turning movement of the trunk body. A proximity detector is on the movable stopper. A signal is output from the proximity detector, according to the situation of the movable stopper after the movable stopper is driven to operate as a stopper or to be released by the drive device, to a discriminating device for discriminating the signal and determine whether the situation of the movable stopper is normal or abnormal, for stopping the driven movement of the industrial robot and enabling the turning movement regions of the turning trunk body to be changed and reset in accordance with a combination of the mechanical stoppers.

BEST MODE FOR CARRYING OUT THE INVENTION

Figure 1:
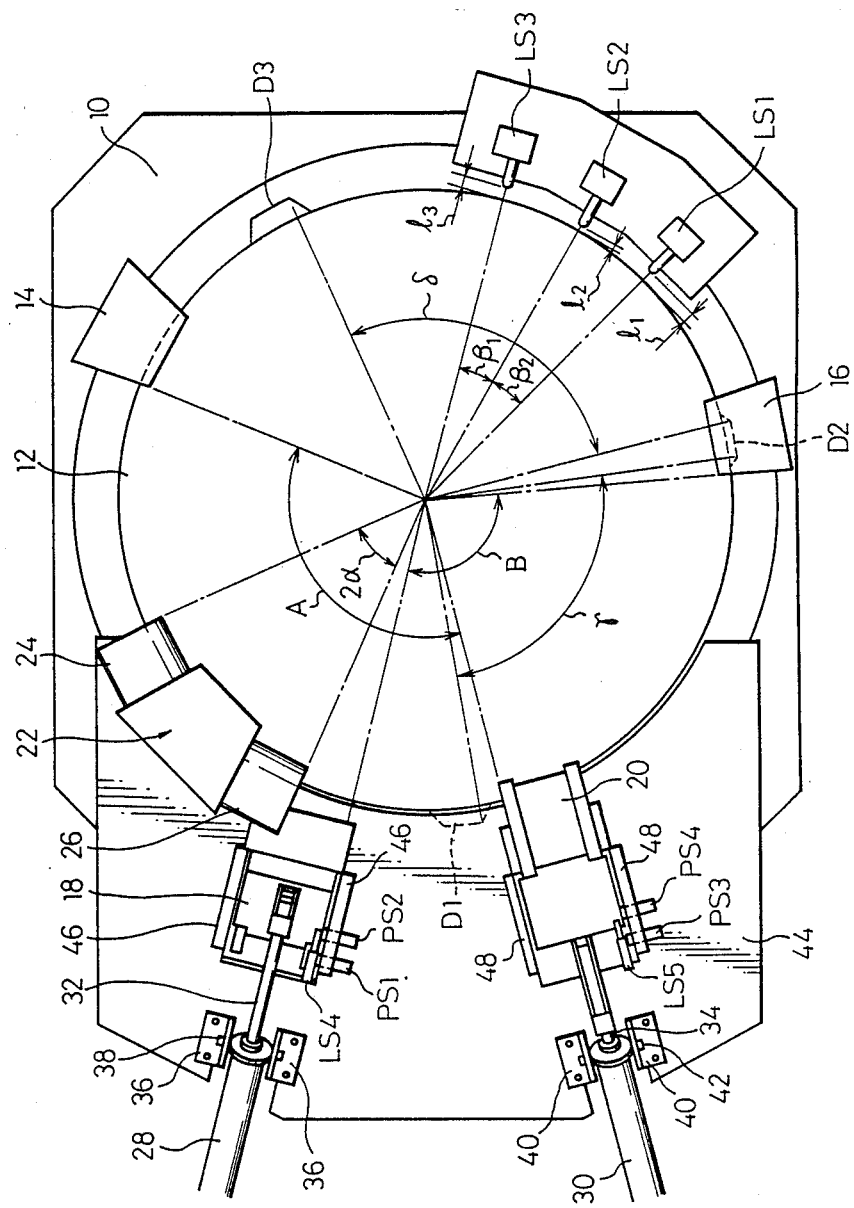
FIG. 1 is a top plan view of an apparatus for setting turning movement regions of a trunk body according to the present invention.

The present invention will be described in detail hereinafter with reference to an embodiment thereof shown in the attached drawings. Referring to FIG. 1, a turning trunk body 12, which is able to turn against a base portion 10 of an industrial robot, is installed in a vertical state. A stopper 22 having rubber members 24 and 26 for absorbing a shock force at both sides is fixed on the outer side of the turning trunk body 12. On the other hand, two fixed stoppers 14 and 16 are fixedly mounted at prescribed positions of the base portion 10, cooperating with the stopper 22 on the turning trunk body to regulate the turning range of the turning trunk body. A plate 44 is fixed on the base portion 10 at an appropriate position in the turning angular range between the two fixed stoppers 14 and 16. A bracket 36 is fixed at a prescribed position of the fixed plate 44, on which bracket a hydraulic cylinder 28 (a pneumatic cylinder is used in this embodiment) is pivoted by a pin 38, and another pneumatic cylinder 30 is pivoted by another pin 42 on another bracket 40, which is fixed at another prescribed position of the fixed plate 44. Each movable stopper 18 or 20 is able to be driven by a cylinder-piston mechanism and is connected to each of the ends of positions 32 and 34 accommodated in the cylinders 28 and 30. The movable stopper 18 can rotate with a shaft 50 (shown in FIG. 2) supported rotatively on plates 46, which are fixed at a right angle to a fixed plate 44, and the movable stopper 20 can rotate with a shaft (not shown) supported rotatively on plates 48 which are fixed at a right angle to the fixed plate 44. A plurality of turning movement regions of the trunk body can be set by combining the movable stoppers with the foregoing two fixed stoppers, since two movable stoppers are equipped as mentioned above. In this embodiment, a turning movement angle region A or B is set by a combination of the fixed stopper 14 and the movable stopper 20, and by combination of the fixed stopper 16 and the movable stopper 18, respectively.

Figure 2:
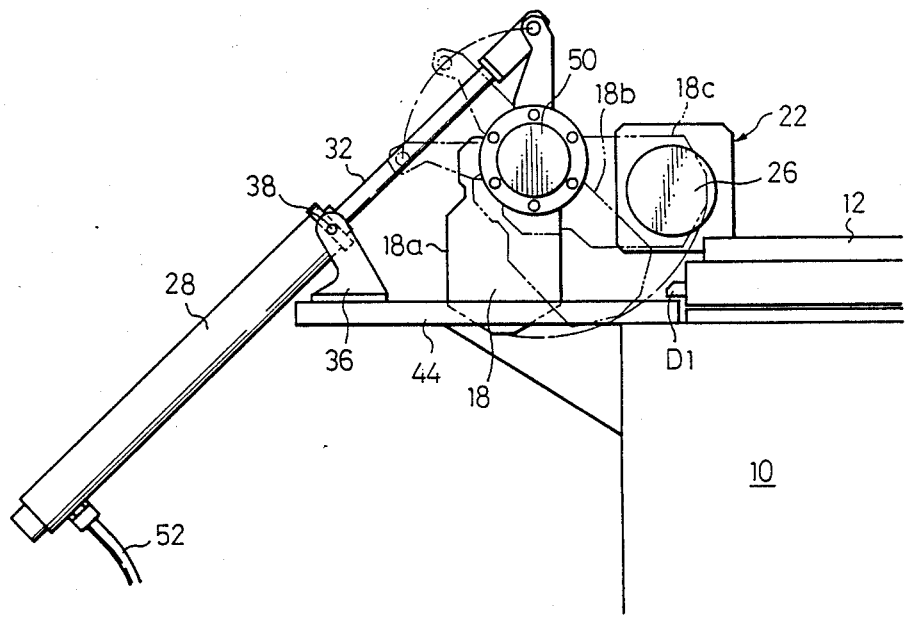
FIG. 2 is a partial side view of the apparatus shown in FIG. 1.

FIG. 1 shows the state wherein a turning movement can be made in the turning region A. In order to change the turning region A to the turning region B, for work to be done, the pneumatic cylinder 30 is driven to release the movable stopper 20 from the stopper position, the stopper 22 on the turning trunk body is moved to a position in the turning region B, and then the pneumatic cylinder 28 is driven to move the movable stopper 18 in a rotation movement to a position for a stopper. The movement of the movable stopper 18 is shown in FIG. 2, as a side view. The vertical position shown by a solid line 18a is the position where a stop function is fully released, the horizontal position shown by a imaginary line 18c is the position where a stop function acts fully, and another position shown by another imaginary line 18b is a position between the above-mentioned two positions.

Figure 3:
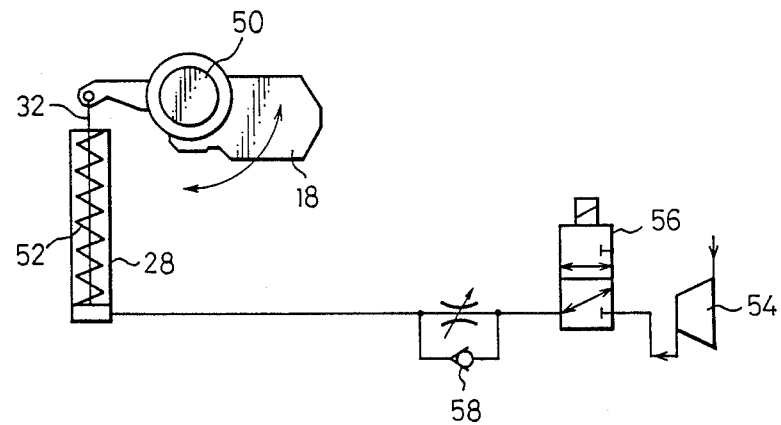
FIG. 3 is a schematic view of a driving mechanism of a movable stopper.

Referring to FIG. 3, compressed air is supplied to the pneumatic cylinder 28 (or 30) via an electromagnetic valve 56 from a compressed air source 54. The piston 32 (or 34) accommodated in the pneumatic cylinder 28 (or 30) is always forced downward by a compressed coiled spring 52. Therefore, the movable stopper 18 (or 20) is forced to be in the horizontal state at an ordinary operation to act as a stopper. A compressed air supplied via the electromagnetic valve 56 forces the piston 32 (34) upward against the force of the coiled spring 52 and moves the movable stopper (18 or 20) to the vertical position to release the stop function. When the stop function is needed again, the compressed air in the cylinder 28 (or 30) is drawn out via a nonreturn valve 58.

The trunk body 12 is moved and turned in two turning regions A and B defined by using four mechanical stoppers 14, 16, 18, and 20. Desirably, mechanical impact force is reduced to the lowest level, and in view of protecting a drive motor, a power supply source of the motor for driving the trunk body 12 is cut off upon a collision. Limit switches are used in order to shut off electric power supplied from the power supply source for driving the trunk body 12 just before each stopper for each turning region A or B and the stopper 22 on the trunk body collide with each other. Three limit switches LS1, LS2, and LS3 are arranged fixedly to the base portion 10, each of which is spaced from the outer surface of the trunk body 12 by prescribed distances l1, l2, or l3, respectively. On the other hand, three dogs D1, D2, and D3 are attached to the prescribed positions on the outer surface of the trunk body 12 in correspondence to three limit switches LS1, LS2, and LS3. The height of dog D2 is lowest. Each distance length l1, l2, or l3 between the outer surface of the trunk body 12 and each limit switch LS1, LS2, or LS3 is set so as to be the length between the heights of the dogs D2 and D1, the length lower than the height of the dog D2, and the length between the heights of the dogs D2 and D3, respectively. Whereby the dog D2 can cooperate with only the limit switch LS2. FIG. 1 shows the state of turning in the turning region A, wherein the dogs D2 and D3 regulate the turning region A in correspondence to the limit switches LS2 and LS3, respectively. A distance angle $\delta$ between the dogs D2 and D3 is equal to $A-2\alpha+\beta1$, where the angle showing the width of the stopper 22 on the trunk body is $2\alpha$, and the distance angle between the limit switches LS2 and LS3 is $\beta1$.

The trunk body 12 must be turned in the counterclockwise direction in FIG. 1 by releasing the movable stopper 20 in the above-mentioned state when the turning region A is changed to the region B. First, the dog D2 must pass the limit switch LS1, but an error operation which shuts off the electric power supplied from the power supply source for driving the trunk body 12 does not occur because the distance length l1 between the limit switch LS1 and the outer surface of the trunk body is set to be longer than the height of the dog D2. The limit switch LS2 to be passed next by the dog D2 is pressed on by the dog D2, because the distance length l2 is shorter than the height of the dog D2. A limit switch LS4 or LS5 is provided on the movable stopper 18 or 20 respectively, so that, in this case, the turning movement of the trunk body 12 is not stopped by cutting off the electric power supplied from the power supply source.

Figure 4:
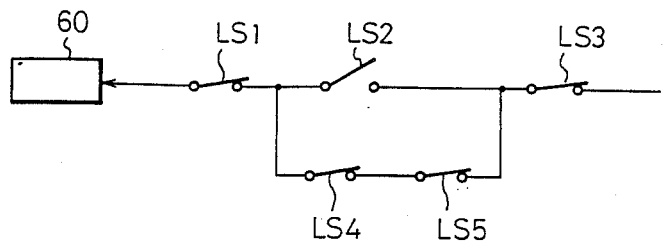
FIG. 4 is a circuit diagram using limit switches.

FIG. 4 shows a circuit diagram connecting the above-mentioned five limit switches and an emergency halt circuit 60. The emergency halt circuit 60 shuts off the electric power supply when an OFF signal is input thereto, to stop the turning of the trunk body 12. Limit switches LS1, LS2, and LS3, which are usually closed, are connected in series, and an ON signal is usually input to the emergency halt circuit 60. Other limit switches LS4 and LS5 connected in series are connected in parallel to the limit switch LS2. The limit switch LS4 or LS5, which corresponds to the movable stopper 18 or 20, respectively, is designed to be closed when the stop function of each movable stopper is released. Only the limit switch LS2 is open, as the limit switch LS2 is pressed on by the dog D2 as mentioned above when the turning region A of the trunk body 12 is changed to the region B. On the other hand, the limit switches LS4 and LS5 are closed because the two movable stoppers 18 and 20 are released from the closed position, and thus an ON signal is input to the emergency halt circuit 60. Therefore, the supply of the electric power is not stopped. FIG. 4 shows the above-mentioned states of the limit switches.

Next, the dog D2 passes the limit switch LS3. The dog D2 does not press on the limit switch LS3 to open the switch in passing, as the distance length l3 is longer than the length of the height of the dog D2. Therefore, the turning region A can be changed to the region B.

Subsequently, the movable stopper 18 is moved to the position where the stopper 18 serves as a stopper, so that the stopper 18 serves as a mechanical stopper for regulating one end of the turning region B. The limit switch LS4 corresponding to the movable stopper 18 becomes open as the movable stopper 18 is positioned at the position where the stopper 18 serves as a stopper, and thus the limit switch LS4 does not serve as a bypass of the limit switch LS2. Therefore, from this point, the regulation of one end of the turning region B is done by cooperation of the dog D1 and the limit switch LS1, and the regulation of the other end is done by cooperation of the dog D2 and the limit switch LS2. The distance angle $\gamma$ by which the dogs D1 and D2 are apart from each other is equal to $B-2\alpha+\beta2$, where the distance angle by which the limit switches LS1 and LS2 are apart from each other is $\beta2$.

Proximity detectors PS1 and PS2 are provided on the plate 46, and other proximity detectors PS3 and PS4 are provided on the plates 48, to check whether or not the movable stoppers 18 and 20 are positioned at the horizontal position 18c (FIG. 2) where the stoppers 18 and 20 serve as stoppers, and positioned at the vertical position 18a where they are fully released from the position serving as a stopper. The proximity detectors PS2 and PS4 are switches for checking whether or not the movable stoppers 18 and 20 are positioned at the horizontal position 18c, and the proximity detectors PS1 and PS3 are switches for checking whether or not the movable stoppers 18 and 20 are positioned at the vertical position 18a.

Output signals produced by four proximity detectors according to the positions of two movable stoppers are shown in the following Table 1.

TABLE 1

| Positions of Movable Stoppers 18 and 20 | OUTPUT SIGNALS Proximity Detector | |
|---|---|---|
| | PS1 (PS3) | PS2 (PS4) |
| Horizontal Position 18c | ON | ON |
| Middle Position 18b | ON | OFF |
| Vertical Position 18a | OFF | OFF |

The four proximity detectors are disposed so that the output signals produced by the proximity detectors are as shown in Table 1.

When a robot starts operation in a turning region, for example, the region A, it is confirmed that the movable stopper 18 is positioned at the vertical position when a controller (not shown) receives an OFF signal from the proximity detector PS1, and that the movable stopper 20 is positioned at the horizontal position to serve as a stopper when the controller receives an ON signal from the proximity detector PS4. After the confirmation, a command signal for turning, etc., is transmitted from the controller to each drive means corresponding to each movable part of the robot to be operated. In consequence, the command signal for operation is not sent when the movable stopper 18 (or 20) interferes with an object body to be positioned at the middle position 18b shown in FIG. 2, and so on. Both stoppers 18 and 20 must be positioned at the vertical position when the turning region is changed. It is confirmed that both stoppers 18 and 20 are positioned at the vertical position when the controller receives the signals from the proximity detectors PS1, PS3.

Assume now that the compressed coiled spring 52 in the pneumatic cylinder 30 is damaged, or that an error signal from the controller is transmitted to the electromagnetic valve 56 to supply a compressed air into the pneumatic cylinder 30, and so on, when the robot actually operates after starting operation. In the above case, the movable stopper 20 turns downward to be retracted so that it no longer regulates the turning region. Therefore, care must be taken to prevent the trunk body 12 from turning over into the turning region A, and interfering with an operating object, etc., positioned in the outer region of the region A. In view of this, a safety circuit is constructed so as to shut off an electric power for driving the robot by the emergency halt circuit 60.

Figure 5:
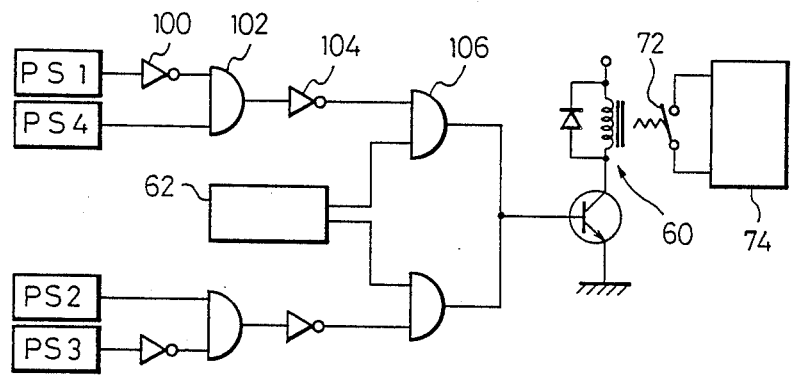
FIG. 5 is an emergency halt circuit diagram using approximate switches.

The safety circuit is described in the following with reference to FIG. 5. The movable stopper 18 must be positioned at the vertical position, and the movable stopper 20 must be positioned at the horizontal position, when the robot operates in the region, for example, A, to be regulated. In this case, the proximity detector PS1 must send an OFF signal, and the proximity detector PS4 must send an ON signal. The OFF signal from the proximity detector PS1 is changed to an ON signal through an inverter 100, and is transmitted to an AND gauge 102 with an ON signal from the proximity detector PS4. The ON signal from the AND gate 102 is changed to an OFF signal through an inverter 104, and transmitted to an AND gate 106. On the other hand, the operation control signal for the robot is transmitted to the robot from a robot drive control circuit 62 of the controller, so that an ON signal is transmitted to an AND gate 106 from the robot drive control circuit 62 hen the robot operates. In the above conditions, the AND gate 106 sends an OFF signal so that the emergency halt circuit 60 is not activated. The OFF signal is output from the AND gate 102, and changed to an ON signal through the inverter 104 so that an ON signal is transmitted to the AND gate 106 when the movable stopper 18 or the movable stopper 20 or both stoppers 18 and 20 are positioned at the middle position 18b shown in FIG. 2. In the above case, an ON signal is output from the AND gate 106 to activate the emergency halt circuit 60, so that a switch 72 for the power supply source 74 for driving the robot, which switch is usually closed, is opened. The operation of the safety circuit when the robot operates in the regulated turning region B is the same as the abovementioned operation, with the proximity detector PS2 acting as the PS4, and the proximity detector PS3 acting as the PS1.

As apparent from the foregoing description a plurality of turning movement regions of the trunk body of the robot can be set and a suitable turning movement region can be selected in accordance with the type of operation, as the movable stoppers are comprised in the apparatus according to the present invention, and the turning mechanism and the drive motor of the robot can be protected by shutting off the electric power supply by electrical means just before the collision between mechanical stoppers. Furthermore, it can be confirmed whether or not the movable stopper is in a correct state and the movement of the robot can be stopped when the movable stopper does not serve as a stopper, by the proximity detector attached to the movable stopper. In consequence, the robot can be prevented from operating outside the prescribed region to be regulated, and thus can be prevented from interfering with an operation object.

We claim:

1. An apparatus for setting a plurality of turning movement regions of a trunk body of an industrial robot, the trunk body being driven to turn against a base portion of the industrial robot within each said turning movement region, said apparatus comprising:
    at least two mechanical stoppers on said base portion, at least one of said mechanical stoppers being a movable stopper having a drive means for rotating said movable stopper from a vertical position to a horizontal position where said movable stopper operates as a stopper and for rotating said movable stopper from said horizontal position to said vertical position where said movable stopper is released from operating as a stopper; and
    a stopper on said trunk body cooperating with said mechanical stoppers for stopping said turning movement of said trunk body,
    wherein operating said movable stopper to change a combination of said mechanical stoppers, thus changes and resets the turning movement regions of said trunk body.

2. An apparatus for setting a plurality of turning movement regions of a trunk body of an industrial robot, according to claim 1, wherein the number of said mechanical stoppers is four and two stoppers of said four mechanical stoppers are fixed stoppers which are positioned at ends in a circular direction in a sum region of said plurality of turning movement regions and the other two stoppers are movable stoppers each having a drive means, said fixed stoppers and said movable stoppers setting two turning movement regions according to a pairing thereof.

3. An apparatus for setting a plurality of turning movement regions of a trunk body of an industrial robot, according to claim 1, wherein limit switches are mounted on said base portion and dogs are mounted on said trunk body so as to be positioned in correspondence with said limit switches, said dogs cooperating with said limit switches to shut off an electric power supply to a turn drive means for said trunk body just before a collision between each of said mechanical stoppers and said stopper on said trunk body.

4. An apparatus for setting a plurality of turning movement regions of a trunk body of an industrial robot, according to claim 2, wherein three limit switches are disposed in a row on said base portion so as to be in prescribed positions and three dogs are disposed on the outer surface of said trunk body in correspondence with said limit switches, a prescribed dog of said three dogs and the limit switch in a middle position of said three limit switches being commonly used as a switch means for regulating one limit end position of each of said two kinds of turning movement regions, said dogs cooperating with said limit switches to shut off the electric power supply to a turn drive means for said trunk body just before a collision between each of said mechanical stoppers and said stopper on said trunk body.

5. An apparatus for setting a plurality of turning movement regions of a trunk body of an industrial robot, according to claim 1, 2, 3 or 4, wherein said drive means comprises a spring means for forcing said movable stopper in a direction where at said movable stopper operates as a stopper, and a hydraulic cylinder-piston mechanism for releasing said movable stopper against the force of said spring means.

6. An apparatus for setting a plurality of turning movement regions of a trunk body of an industrial robot, according to claim 2, wherein three limit switches are mounted on said base portion so that the second limit switch is positioned between the first and third limit switches and three dogs are mounted on said trunk body so as to be positioned in correspondence with said three limit switches, each of said three limit switches is positioned apart from a surface of said trunk body by distances l1, l2, or l3, respectively, and each height of said three dogs is designated as d1, d2, or d3, respectively, having the following relationships:

$d1 < l1 < d1$ $l2 < d2$ $d2 < l3 < d3$ and wherein fourth and fifth limit switches are each mounted on said two movable stoppers, respectively, and said three limit switches are connected in series, and said fourth and fifth limit switches are connected in parallel with said second limit switch while the fourth limit switch is connected in series with the fifth limit switch, so that the first, third, fourth and fifth limit switches are electrically connected when said two movable stoppers are positioned at releasing positions, and said trunk body turns so that said second limit switch is opened by a pressure from said dog.

7. An apparatus for setting a plurality of turning movement regions of a trunk body of an industrial robot, the trunk body being driven to turn against a base portion of the industrial robot within each said turning movement region, said apparatus comprising:
  at least two mechanical stoppers on the base portion, at least one of said mechanical stoppers being a movable stopper having a drive means for rotating said movable stopper from a vertical position to a horizontal position where said movable stopper operates as a stopper and for rotating said movable stopper from said horizontal position to said vertical position where said movable stopper is released from operating as a stopper;
  a stopper on said trunk body cooperating with said mechanical stoppers for stopping said turning movement of said trunk body; and
  a proximity detector on said movable stopper, a signal being output from said proximity detector, according to a state of said movable stopper after said movable stopper is driven to operate as a stopper or to be released by said drive means, to a discriminating means for discriminating said signal to determine whether a situation of said movable stopper is normal or abnormal for stopping the driven movement of said industrial robot,
  therein enabling the turning movement regions of said trunk body to be changed and reset in accordance with a combination of said mechanical stoppers.

* * * * *